Sept. 21, 1954 K. OSSENBACH 2,689,505
COPYING, PROFILING, OR ENGRAVING MACHINE
Filed March 12, 1954
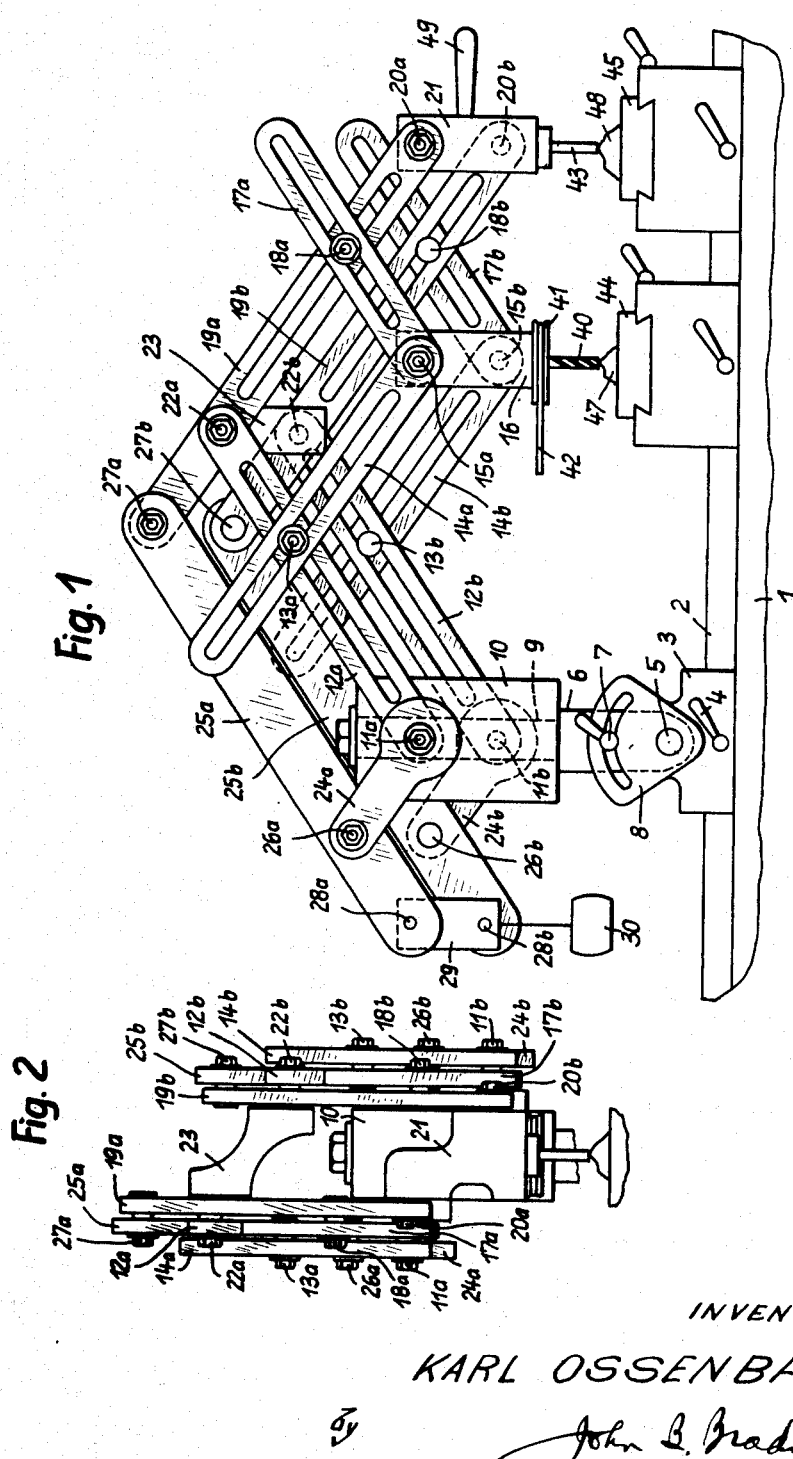
INVENTOR
KARL OSSENBACH,
By
John B. Brady
ATTORNEY

Patented Sept. 21, 1954

2,689,505

UNITED STATES PATENT OFFICE 2,689,505

COPYING, PROFILING, OR ENGRAVING MACHINE

Karl Ossenbach, Baumberg (Rhine), near Dusseldorf, Germany, assignor to Hans Deckel, Munchen-Solln, and Friedrich Wilhelm Deckel, Post Tutzing, Germany Application March 12, 1954, Serial No. 415,743

4 Claims. (Cl. 90—13.1)

This invention relates to a copying, profiling or engraving machine tool in which at least one tool is parallelly controlled by a tracer element through the intermediary of a pantograph mechanism or linkage.

Known machines of this type are usually very complicated and heavy in their construction, because—even where a parallelly controlled motion is attained—projecting arms or jibs, compound slide rests, additional control levers or the like, are necessarily used in the pantograph mechanism.

In order to eliminate such hitherto necessary structural elements and produce a pantograph mechanism of simplest and lightest construction, assuring accurate enlargement and reduction, the pantograph linkage of the invention is composed of a number of pantographs of identical construction and dimensions, arranged in pairs beside and below each other with all corresponding points parallel, and interconnected for the purpose of performing conjoint motions.

The invention will be more fully understood from the following specification which sets forth a representative embodiment of the invention by reference to the accompanying drawings wherein:

Fig. 1 is a perspective view of this embodiment.

Fig. 2 is a sectional elevation of the same.

The illustrated machine comprises a bedplate 1 with a horizontal guide 2 along which a slide or carriage 3 works. A locking handle 4, can hold the slide 3 in any required position. The slide 3 carries a horizontal spindle 5 on which an inclineable bearing pin 6 is fitted. The preset inclination of this bearing pin 6 is maintained by a lever grip 7 arranged thereon and working in a fixed clamping plate 8 on the slide 3. The upper end of the bearing pin 6 is formed as a stepped pivot 9 on which a bearing bush 10 is rotatably mounted.

The pantograph mechanism or linkage consists in the present example of two individual pantographs of identical kind and size which are arranged with their working planes parallel to each other; but in such manner that the corresponding points of the two pantographs are at different heights or levels, with reference to each other. The front pantograph in Fig. 1 has one pivot 11a in the main bearing bush 10, to which the arm 12a is hinge-connected. This arm 12a carries the pivot pin 13a of the arm 14a which is hinged to a pivot pin 15a in a tool carrier or tool head 16. The next pantograph arm 17a is likewise rotatable about the pivot 15a in the tool head 16, and itself carries a pivot bearing 18a for the further pantograph arm 19a which is linked at the point 20a to the tracer head 21. The arms 19a and 12a are connected by the hinge joint 22a of a cross-bar 23.

The pantograph arms 12a, 14a, 17a and 19a have longitudinal slots by which the transmission ratio of the pantograph system can be adjusted as required. These slots are represented in the drawing but, for the sake of clarity, are not distinguished by separate reference numbers.

The rear pantograph, fitted behind or on the other side of the cross-bars 10, 16, 21 and 23, is of the same construction and dimensions as the front pantograph, 11a to 22a. Its plane is likewise parallel to the plane of the first pantograph, but its corresponding pivot points and arms 11b to 22b are placed somewhat lower than those of the first pantograph.

A short arm 24a is further attached on the pivot 11a. An arm 25a further connects the pivot 26a of the short arm 24a with the pivot 27a on the arm 19a of the first pantograph. Similar linkages 24b to 28b are provided on the other pantograph. The ends 28a, 28b of the arms 25a, 25b are interconnected by a cross-bar 29 carrying a weight 30 compensating the weight of the two pantographs.

The tool head 16 carries a suitable tool, for instance a milling cutter 40, which is driven, through a belt pulley 41 and a belt 42, by the machine driving motor (not shown). The tracer head 21 carries a tracer point or pin 43.

The guide 2 of the bedplate 1 further carries two longitudinally and traversing adjustable and securable tables 44 and 45. The table 44 is situated underneath the tool 40 and carries the work piece 47, while the pattern or template 48 attached on the table 45 is traced over by the tracer pin 43. When the tracer head 21 is moved by means of the handle 49, the tracer 43 is guided over the pattern and its motion communicated in the required transmission ratio, by means of the two pantographs, to the tool 40.

By virtue of the arrangement of the two separate pantographs forming the pantograph mechanism, invariably parallel guiding of the main bearing, tool head and tracer head is most simply assured. When the bearing pin 6, 9 is suitably inclined, the tool head and the tracer head are inclined correspondingly, so that vertical surfaces can also be suitably traced.

It is obvious that, according to the selected arrangement of the tracer and tool heads on the pantograph, or according to the selected transmission ratio between the same, both enlargement and reduction are possible. It will also be understood that it is also possible to provide more than two pantographs, suitably paired and reciprocally staggered, on either side of the main bearing, tool head, and tracer head cross-bars.

While I have described one of the preferred embodiments of my invention I realize that modifications may be made and I desire that it is understood that no limitations upon my invention are intended other than may be imposed by the scope of the appended claims.

What I claim and desire to secure by Letters Patent of the United States is:

1. A copying, profiling or engraving machine tool comprising in combination a bed or column, a table carrying a workpiece, a table carrying a pattern, said tables being movable on and with respect to said bed, a main bearing mounted on said bed, a first pantograph linkage with a main bearing point, a tooling point and a tracing point, said main bearing point of the first pantograph linkage being mounted on the one side of said main bearing, a second pantograph linkage with a main bearing point, a tooling point and a tracing point, said second pantograph linkage being of the identical form and size with respect to the first pantograph linkage, said main bearing point of the second pantograph linkage being mounted on the other side of said main bearing beside and below the main bearing point of the first pantograph linkage, cross-bars equidistantly arranged between and interconnecting the other corresponding points of said two pantograph linkages beside and below each other for the purpose of conjoint and parallel motion.

2. A copying, profiling or engraving machine tool as set forth in claim 1 in which the cross-bar connecting the tooling points of said two pantograph linkages carries a driven tool operating on said workpiece and the cross-bar connecting the tracing points of said two pantograph linkages carries a tracing pin cooperating with said pattern.

3. A copying, profiling or engraving machine tool comprising in combination a bed or column, a table carrying a workpiece, a table carrying a pattern, said tables being movable on and with respect to said bed, a main bearing mounted on said bed, a first pantograph linkage with a main bearing point, a tooling point and a tracing point, said main bearing point of the first pantograph linkage being mounted on the one side of said main bearing, a second pantograph linkage with a main bearing point, a tooling point and a tracing point, said second pantograph linkage being of the identical form and size with respect to the first pantograph linkage, said main bearing point of the second pantograph linkage being mounted on the other side of said main bearing beside and below the main bearing point of the first pantograph linkage, cross-bars equidistantly arranged between and interconnecting the other corresponding points of said two pantograph linkages beside and below each other for the purpose of conjoint and parallel motion, said main bearing and thereby the pantograph linkages is rotatable about an axis adjustably mounted on said bed or column.

4. A copying, profiling or engraving machine tool as set forth in claim 3 in which said axis of rotation of the main bearing is inclinable and securable with reference to said bed or column.

No references cited.